United States Patent [19]

Kitamura et al.

[11] 4,268,870
[45] May 19, 1981

[54] RECORDING APPARATUS FOR READING INFORMATION FROM AN ORIGINAL

[75] Inventors: Takashi Kitamura; Hisashi Sakamaki, both of Yokohama; Naoto Kawamura, Inagi, all of Japan

[73] Assignee: Canon Kabushiki Kaisha, Tokyo, Japan

[21] Appl. No.: 33,524

[22] Filed: Apr. 26, 1979

[30] Foreign Application Priority Data

Apr. 28, 1978 [JP] Japan .................................. 53-51850

[51] Int. Cl.³ .......................... H04N 1/22; H04N 1/10
[52] U.S. Cl. .................................... 358/296; 358/293; 358/285
[58] Field of Search ............... 358/293, 285, 212, 213, 358/296, 298, 299

[56] References Cited

U.S. PATENT DOCUMENTS

| 3,830,975 | 8/1974 | Potter | 358/285 X |
| 3,867,569 | 2/1975 | Watson | 358/293 |
| 3,962,681 | 6/1976 | Requa et al. | 358/293 X |
| 4,009,332 | 2/1977 | Van Hook | 358/280 |
| 4,069,485 | 1/1978 | Martin | 346/75 |
| 4,069,486 | 1/1978 | Fox | 346/75 |
| 4,149,090 | 4/1979 | Agulnek | 358/293 X |
| 4,149,195 | 4/1979 | Gast | 358/283 |

FOREIGN PATENT DOCUMENTS 1534529 12/1978 United Kingdom ................ 358/285

OTHER PUBLICATIONS

Garwin et al., "Use of Tilted Arrays in Display Devices and Scanners", IBM Technical Disc. Bull., vol. 20, No. 1, Jun. 1977, pp. 396–399.
Simms, "The Application of CCD's to Document Scanning", Microelectronics, vol. 7, No. 2, pp. 60–63, Dec. 1975.

Primary Examiner—Alfred H. Eddleman
Assistant Examiner—Donald McElheny, Jr.
Attorney, Agent, or Firm—Fitzpatrick, Cella, Harper & Scinto

[57] ABSTRACT

An information reader apparatus includes an original support, information reading device having a plurality of mutually parallel reading arrays spaced by plural (n) times of the reading scan distance and composed of plural reading elements, a display device for displacing the position of information reading by the reading device on the original, detector for detecting the amount of displacement of the reading position by the displacing device, and instruction device for instructing the start of information reading by the reading device upon detection by the detector of the displacement of the reading position by m-times of the reading scan distance, wherein "m" is different from "n".

18 Claims, 19 Drawing Figures

FIG. 11D

RECORDING APPARATUS FOR READING INFORMATION FROM AN ORIGINAL

BACKGROUND OF THE INVENTION

1. Field of the Invention

The present invention relates to an information reading apparatus for obtaining record signals adapted to be supplied to a recording apparatus for conducting information recording on a recording medium by means of interlaced scanning.

2. Description of the Prior Art

In a recording apparatus for forming picture elements on a recording medium by driving a recording element such as an ink jet nozzle or a thermal recording head thereby achieving information recording as the assembly of such picture elements, there is generally conducted the simultaneous drive of plural recording elements in order to improve the recording speed.

In such simultaneous drive of plural recording elements a simplest method consists of selecting the distance between the neighboring recording elements equal to the minimum distance of the picture elements to be formed on the recording medium, but such method is fatally defective in that the distance between the picture elements, i.e. the resolution of the recording, is determined by the dimension of the recording elements or the arrangement thereof. Such defect can however be resolved by, as disclosed in the U.S. Pat. Nos. 4,009,332, 4,069,485 and 4,069,486, selecting the distance between the neighboring recording elements equal to n-times of the distance of picture elements and conducting interlaced scanning by each of said recording elements on the recording medium, whereby the recording resolution can be determined irrespective of the distance between the neighboring recording elements.

In such recording method with interlaced scanning, however, there will be required a memory of an elevated capacity for memorizing the record signals obtained from an information reading apparatus and a complicated signal arranging circuit for supplying said record signals in appropriate sequences to the recording elements performing the interlaced scanning.

SUMMARY OF THE INVENTION

The object of the present invention is to provide an information reading apparatus capable for forming record signals adapted for a recording method with interlaced scanning.

Another object of the present invention is to provide an information reading apparatus allowing to dispense with the memory or to reduce the capacity thereof for storing the record signals obtained by scanning of an original.

Still another object of the present invention is to provide an information reading apparatus not requiring the rearrangement of the record signals obtained by scanning of an original.

Still another object of the present invention is to provide an information reading apparatus of a simplified structure.

BRIEF DESCRIPTION OF THE DRAWINGS

FIG. 2 is a view of an information reading apparatus embodying the present invention wherein A and B are respectively a plan view and a cross-sectional view thereof;

FIG. 7 is a view of another embodiment of the information reading apparatus wherein A and B are a plan view and a cross-sectional view thereof;

DESCRIPTION OF THE PREFERRED EMBODIMENTS

Prior to detailed description of the information reading apparatus of the present invention, there will be explained briefly the conventional recording method with interlaced scanning which is to be employed in combination with the present invention.

Figure 1A:
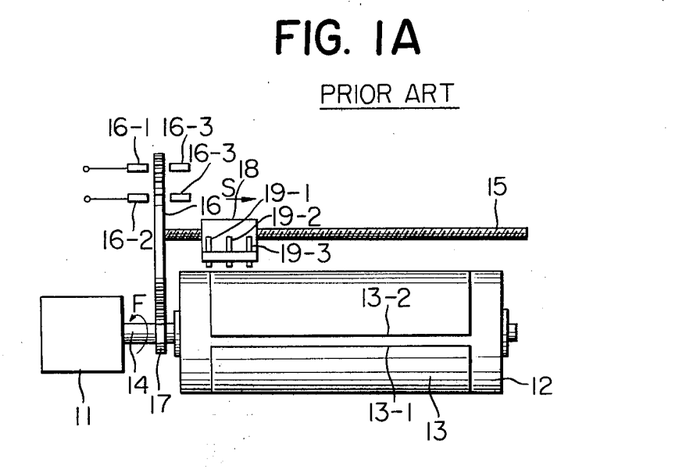
FIG. 1A is a lateral view of a conventional recording apparatus.
Figure 1B:
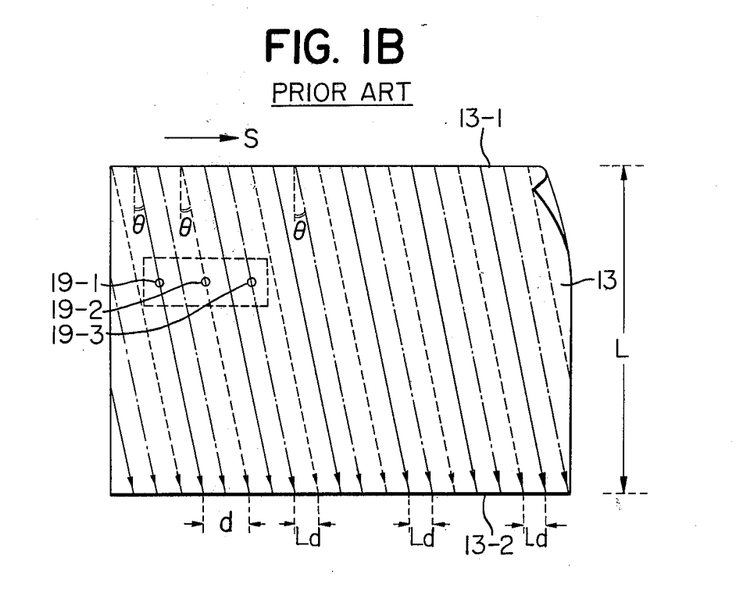
FIG. 1B is a plan view of a recording paper recorded with the apparatus shown in FIG. 1A.

Referring to FIG. 1A showing a recording apparatus for performing a recording on a recording medium (recording paper) by means of interlaced scanning, a motor 11 drives, at a constant speed in a direction of the arrow F, a drum 12 on which a recording paper 13 is wound. Above said drum 12 and parallel to the shaft 14 thereof, a feed screw 15 is rotatably supported by an unrepresented support mechanism and is rotated in synchronization with said motor 11 by means of a gear 16 mounted on said feed screw 15 and a gear 17 mounted on said shaft 14 and meshing with said gear 16. In the present invention there are also provided a start pulse generator 16-1 composed of a photoreceptor for generating a start pulse when the leading end 13-1 of the recording paper 13 wound on the drum 12 reaches a position facing a nozzle 19, an end pulse generator 16-2 for generating an end pulse when the trailing end 13-2 of said recording paper reaches a position facing the nozzle 19, said pulse generators being positioned so as to face said gear 16, and lamps 16-3 functioning in cooperation with said pulse generators, while said gear 16 being provided with an opening to cause said pulse generators 16-1, 16-2 to generate pulses in the aforementioned timings. On said feed screw 15 there is fitted a movable support 18, whereby the rotation of the motor 11 causes the displacement of said support 18 in a direction of the arrow S at a constant speed and the pulse generation each time the leading or trailing end of the recording paper 13 reaches a position corresponding to the nozzle 19. On said movable support 18 and along said shaft 14 there are supported three ink jet nozzles 19-1~19-3 which are spaced by a distance d equal to twice (k-times) of the scanning line distance Ld to be explained later. Thus, in response to the rotation of the motor 11, nozzle trajectories (scan lines) are formed on the recording paper 13 wound on the drum 12 as shown in FIG. 1B, wherein the full line, broken line and chain line respectively indicating the trajectories of the nozzles 19-1, 19-2 and 19-3. Therefore, if the distance between the neighboring scan lines on the recording paper 13 is defined as Ld, it is rendered possible to scan the entire surface of said recording paper 13 with scan lines distances by said Ld by displacing said movable support 18 by a pitch of 3Ld (number of nozzles×Ld) for each rotation of the drum 12.

FIG. 1B shows the position of the nozzles 19 during the scanning operation. As shown in this drawing said nozzles are mutually separated by twice of the scan line distance and are displaced by three times of said scan line distance for each rotation of the drum, wherein all the scan lines are eventually traced by the interlaced scanning of said nozzles. It will be noted that the scan lines formed on said recording paper 13 are inclined by a certain angle $\theta$ from a direction perpendicular to the displacing direction of said nozzles 19. In a more generalized expression, a scanning as explained can be achieved for a number N of nozzles and a nozzle distance k if k/N is non-reducible and the movable support is displaced by a pitch of N×Ld.

The present invention, relating to an information reading apparatus capable of forming record signals adapted to be supplied to a recording apparatus for conducting information recording by an interlaced scanning method as explained above, will be explained in detail in the following while making reference to the attached drawings.

Figure 2A:
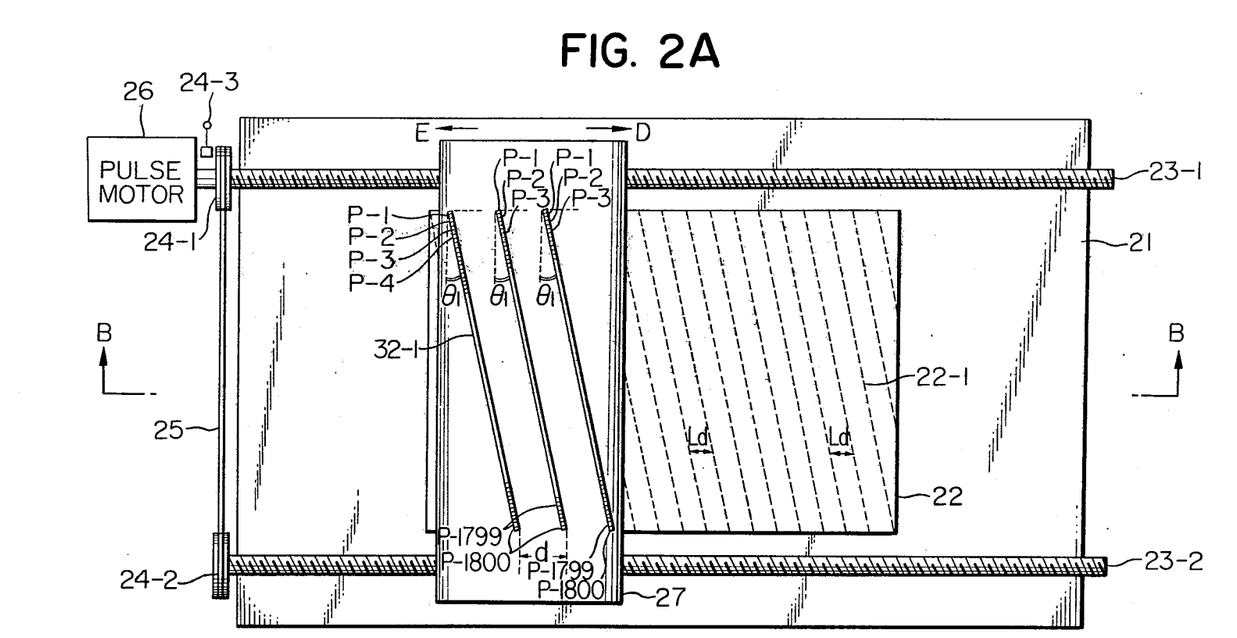
Figure 2B:
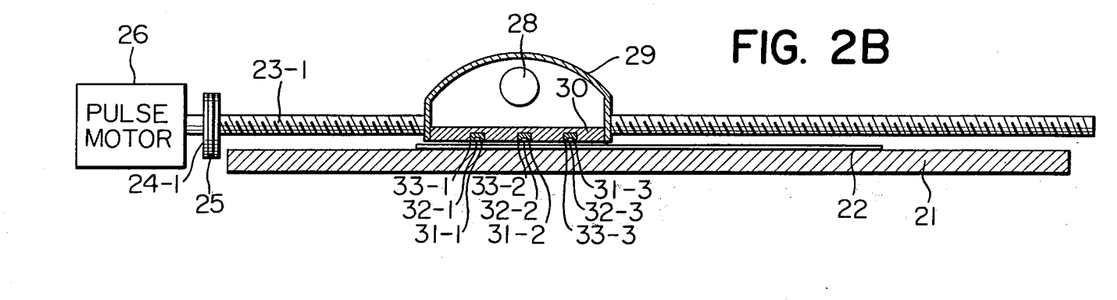

FIG. 2 shows an information reading apparatus embodying the present invention, wherein there are provided, on an original support table 21, rotatably supported feed screws 23-1, 23-2 which are mutually parallel and also parallel to said original support table 21 and which are respectively provided with gears 24-1, 24-2 mutually linked by a chain 25, said feed screw 23-1 being fixed to a stepping motor 26. A support 27 is fitted on said feed screws 23 so as to perform a parallel displacement in a direction of the arrow D or E by the rotation of said motor 26. Said support 27 is provided with a support plate 30 made of a translucent material such as glass or synthetic resin and positioned so as to be spaced by a small distance $\Delta d$ from an original 22 placed on said original support table 21. On a surface of said support plate 30 facing the original 22 there are provided mutually parallel three grooves 31-1~31-3 accomodating photoreceptors 32-1~32-3 each composed of linearly arranged 1800 photo-receiving elements P-1, P-2, ..., P-1800. Though FIG. 2 shows a top view of the apparatus, the photoreceptors 32 are shown through the support plate to clarify the position of said photoreceptors. Said photoreceptors 32 are positioned in such a manner that the light-receiving faces thereof are directed toward the original 22, and that they are arranged with an angle $\theta 1$ equal to the aforementioned angle $\theta$ with respect to the direction perpendicular to the displacing direction of the photoreceptors 32 and are mutually spaced by the aforementioned distance d. Said grooves 31 are filled, around the photoreceptors 32, with an opaque material 33 to allow the photoreceptors 32 to only receive the light reflected by said original 22. Above said support plate 30 there are provided a lamp 28 such as a fluorescent lamp and a cover member 29 encircling said lamp and functioning as a cover and a reflector, whereby the light emitted by said lamp 28 is transmitted by said support plate 30, reflected by the original 22 and received by the photoreceptors 32 to be converted into electric signals. The output signal from each light-receiving element in said photoreceptors 32 is supplied as a picture element signal to the recording apparatus, so that the recording resolution can be improved simply by increasing the number of light-receiving elements in said photoreceptors. In FIG. 2A, the dotted inclined lines 22-1 shown on the original 22 indicate the scanning trajectories of the photoreceptors 32. In a position facing said gear 24-1, there is provided a pulse generator 24-3 which can be composed of a photodetector for detecting the light transmitted by an opening provided on said gear 24-1 and is adapted to generate a position signal upon each displacement of the photoreceptors 32 by a distance 3Ld. Thus, if the angle $\theta 1$ of said photoreceptors 32 is selected equal to the angle $\theta$ of the scan lines formed by the nozzles on the recording paper 13, the information recording can be achieved simply by supplying the output signals of the photoreceptors 32 to said nozzles. In such case the ink jet nozzles 19 are positioned with respect to the recording paper 13 in the same manner that the light-receiving elements P-1 of the photoreceptors 32-1~32-3 are positioned with respect to the original 22, and the motor 11 is activated in this state while the motor 26 is maintained inactive. The output signals from the photoreceptors 32-1, 32-2 and 32-3 are respectively supplied to the nozzles 19-1, 19-2 and 19-3, and the light-receiving elements P-1, P-2, P-3, ... of said photoreceptors 32 are activated in succession from P-1 to P-1800 within a scanning period of said nozzles on the recording paper (period from said start pulse to said end pulse), each nozzle receiving the output of a light-receiving element thus activated in each photoreceptor.

Figure 3:
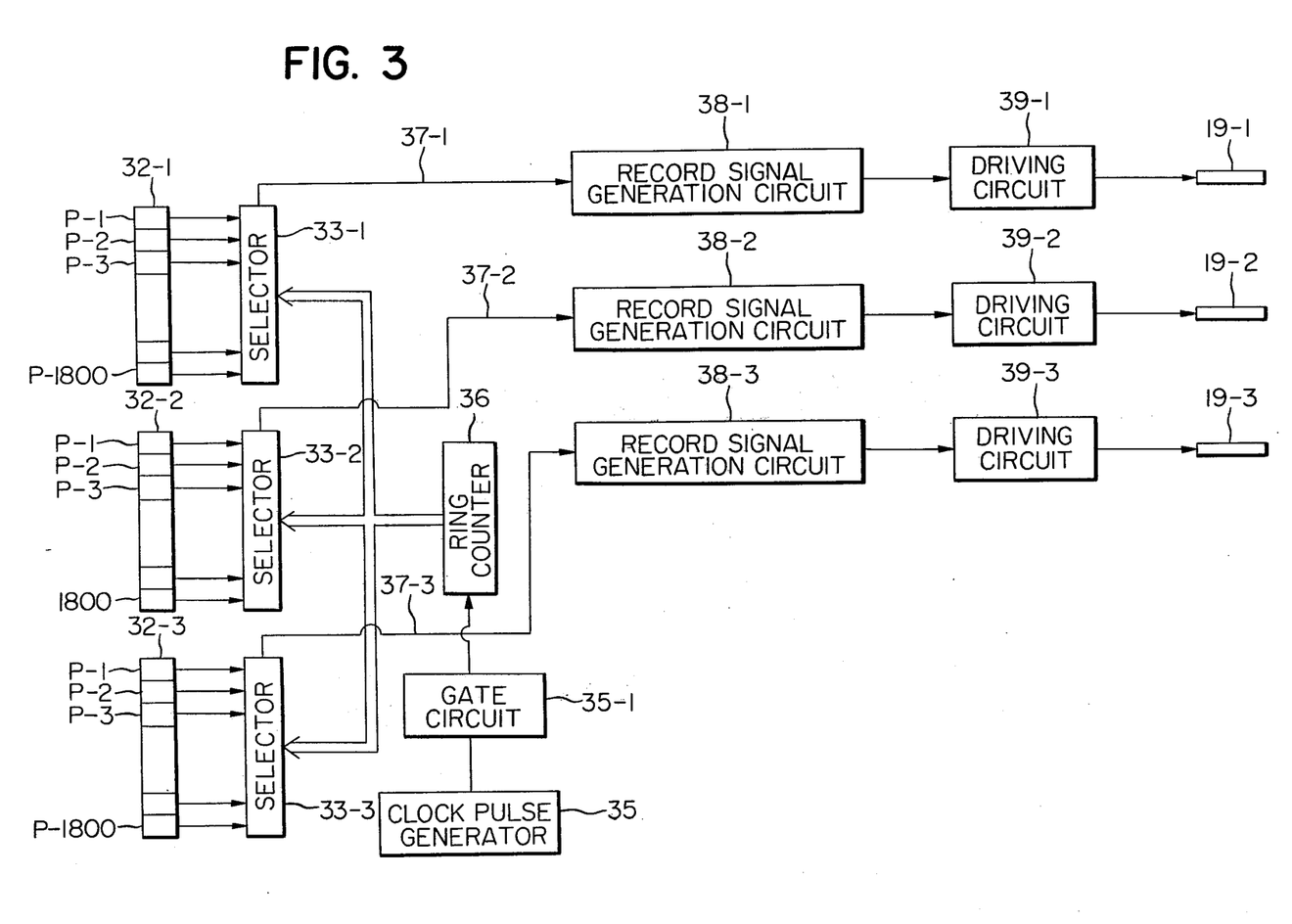
FIGS. 3 and 4 are block diagrams of control circuits to be employed in the information reading apparatus embodying the present invention.

More specifically, as shown in FIG. 3, the outputs from the light-receiving elements P-1~P-1800 of the photoreceptors 32-1~32-3 are respectively supplied to selectors 33-1~33-3 which also receive the output signals from a ring counter 36 step advanced in response to the clock pulses from a clock pulse generator 35, whereby said counter performing a control in such a manner as to cause said selectors, upon receipt of a clock pulse, to transmit the output signals from the elements P-1 to signal lines 37-1~ 37-3, then upon receipt of a succeeding clock pulse to transmit the output signals from the elements P-2 to said signal lines and thereafter to transmit the signals from the light-receiving elements in succession in a similar manner. Between said clock pulse generator 35 and ring counter 36 there is provided a gate circuit 35-1 which is opened by the output from the aforementioned pulse generator 16-1 to transmit the clock pulse to said counter and is closed by the output of the aforementioned pulse generator 16-2.

The signals thus transmitted to the signal lines 37 are converted into record signal 1 or 0 in record signal forming circuits 38 and supplied to drive circuits 39 for driving the ink jet nozzles 19. Upon completion of one cycle of scanning on the recording paper 13 by approximately one rotation of the drum 12, which is indicated by the end pulse generated by the end pulse generator 16-2, the motor 26 is activated to displace the support 27 at a high speed in a direction of the arrow D until a signal is obtained from the signal generator 24-3, thus achieving a step advancement of the support 27 by a distance 3Ld. Since the motor 11 is maintained in operation, a new cycle of scanning on the recording paper 13 is initiated upon release of a start pulse from the start pulse generator 16-1, wherein the output signals from the light-receiving elements of the photoreceptors are again supplied in succession to said ink jet nozzles.

The above-explained structure of the information reading apparatus completely eliminates the memory for storing the information obtained by the photoreceptors 32, and also avoids the necessity to rearrange the information signals for the interlaced scanning.

Figure 4:
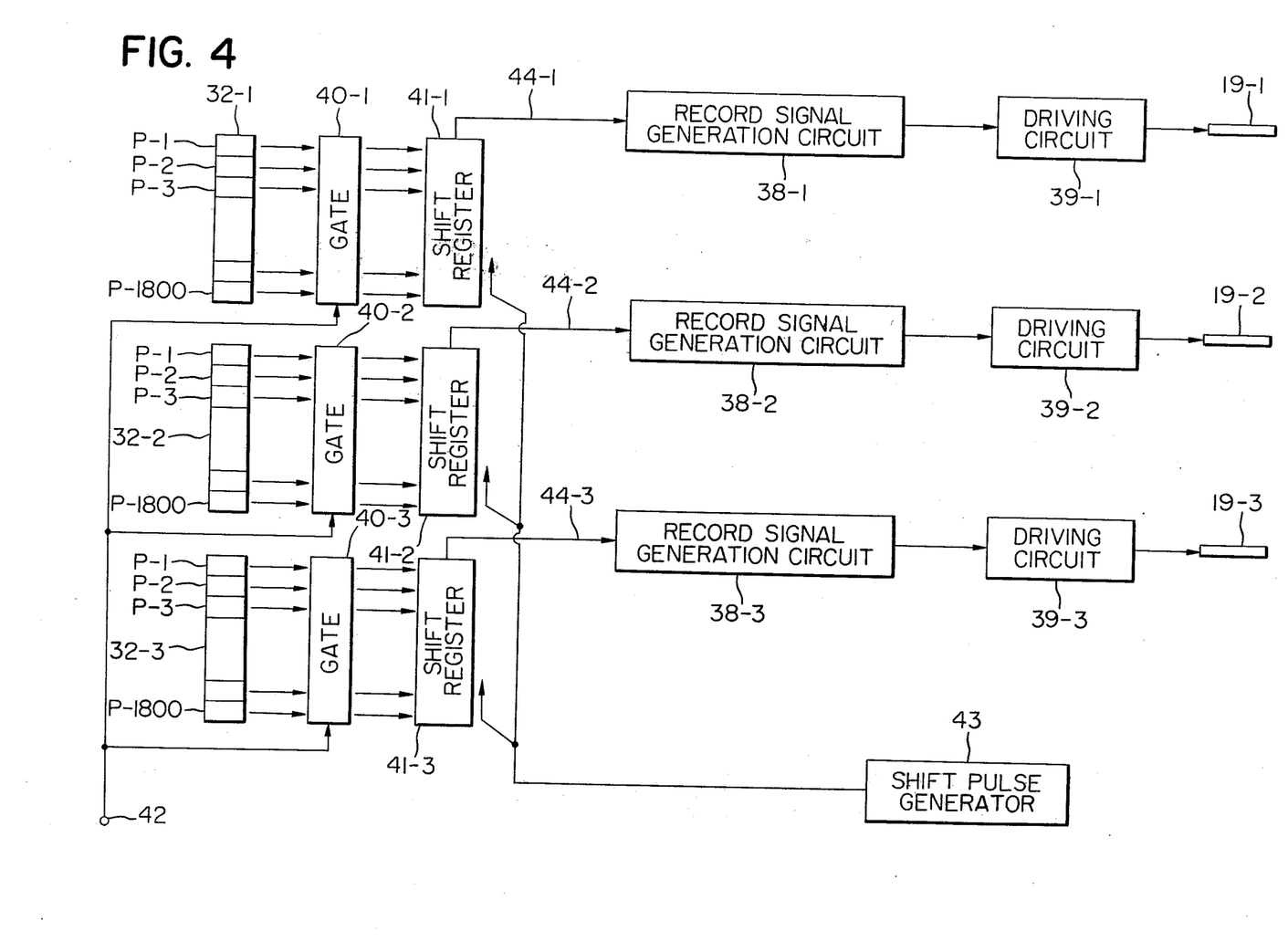

In contrast to the embodiment wherein the photoreceptors are step advanced, a continuous displacement thereof at a constant speed is also possible if certain memories are employed as shown in FIG. 4.

In an embodiment shown in FIG. 4, the outputs of the light-receiving elements P-1, P-2, ..., P-1800 constituting the photoreceptors 32-1~32-3 are supplied through gates 40-1~40-3 to shift registers 41-1~41-3, wherein said gates 40 respectively transmit the content of the photoreceptors 32 to shift registers 41 upon receipt of a trigger signal supplied from a terminal 42. The position signal generated by the aforementioned signal generator 24-1 can be utilized as said trigger signal. The output signals from said shift registers 41 are supplied, in a similar manner as explained in connection with FIG. 3, through record signal forming circuits 38 and drive circuits 39 to the nozzles 19. Said shift registers are adapted to release the contents thereof in succession in response to the shift pulses from a shift pulse generator 43, said shift pulses being of a frequency, as already explained in connection with FIG. 3, selected so as to obtain 1800 shift pulses within a period from a start pulse to a succeeding end pulse on the recording apparatus.

In the information reading apparatus shown in FIG. 4, the support 27 is continuously displaced at a constant speed equal to the displacing speed of the aforementioned support 18 in such a manner that the reading position on the original corresponds to the nozzle position on the recording paper 13. Thus the position signal is derived from the signal generator 24-3 of the information reading apparatus simultaneously with the generation of the start pulse upon arrival of the nozzles 19 at the leading end of the recording paper 13 on the drum 12 in the recording apparatus, said position signal causing the transfer of the information signals in the photoreceptors 32 at a time through the gates 40 to the shift registers 41. Said position signal, being a pulse of an extremely short duration, immediately closes said gates 40 upon completion of the signal transfer to forbid the transfer thereafter.

Said shift registers 41, in response to the shift pulses supplied thereto as explained in the foregoing, supply thus transferred information signals to the signal lines in succession. Said start pulse and position pulse can be obtained in synchronization with the shift pulses if said motors 11, 26 are controlled by said shift pulses from said shift pulse generator 43, and an accurate recording can be achieved in this manner.

As explained in the foregoing, the embodiment shown in FIG. 4 enables a continuous displacement of the photoreceptors merely by employing a certain amount of shift registers or memories, and it will be understood that the circuit for the rearrangement of the obtained signals is still unnecessary in this embodiment.

In contrast to the foregoing two embodiments wherein the angle $\theta 1$ of the photoreceptors is equal to the scan line angle $\theta$ in the recording apparatus, these two angles can be rendered different in a third embodiment of the present invention.

Figure 5:
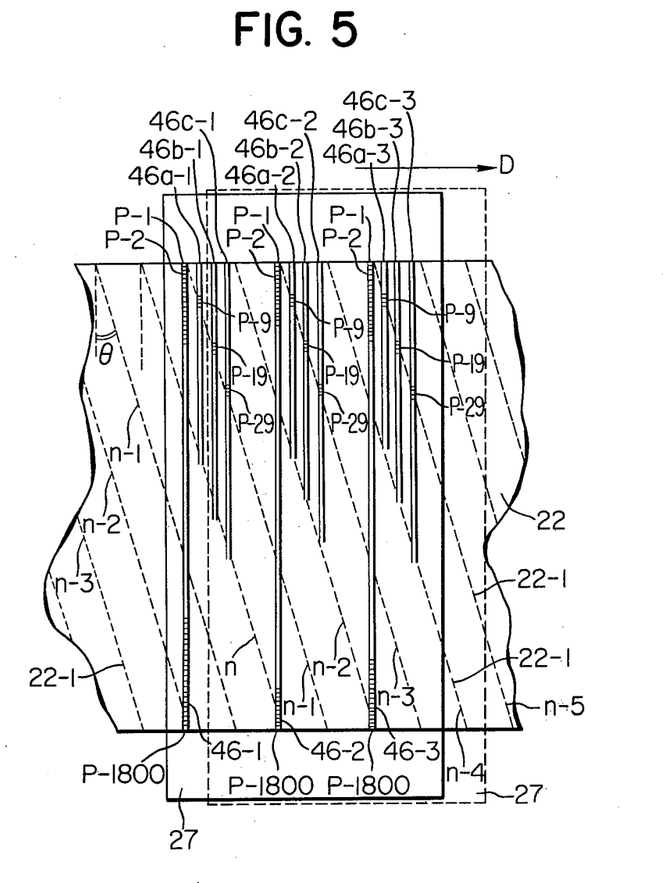
FIG. 5 is a plan view of a principal part of another embodiment of the information reading apparatus.

FIG. 5 shows, in an enlarged view, a principal portion of the support 27 of a third embodiment wherein the photoreceptors 46-1~46-3 are arranged with the angle $\theta 1 = 0$, while the unrepresented portions being constructed similar to those shown in FIG. 2. The reading circuit for receiving the signals from the photoreceptors is basically same as that shown in FIG. 3, and the reading trajectories by said photoreceptors is still inclined by said angle $\theta$.

More specifically this third embodiment is based on a concept that the reading trajectories of the photoreceptors can be inclined as represented by the lines 22-1 regardless of the actual angle $\theta 1$ of said photoreceptors.

In said third embodiment the photoreceptors 46-1~46-3 are provided on the support 27 in a direction perpendicular to the displacing direction D of said support ($\theta = 0$), and the information on the original is read along said reading trajectories by the light-receiving elements P of the photoreceptors upon displacement thereof in the order of 46a, 46b, 46c, ... caused by the continuous displacement of said support 27 in the direction indicated by the arrow D.

In this embodiment, when the photoreceptors are located, as shown by 46-1~46-3, in positions wherein the light-receiving elements P-1 correspond to the start positions of the reading trajectories n-1, n-3 and n-5, signals are read in this state from said elements P-1.

Upon arrival of the photoreceptors at the positions 46a-1~46a-3 after the lapse of a time t1, signals are read from the elements P-9 which are located in this state on said trajectories n-1, n-3 and n-5. Further, upon arrival of the photoreceptors at the positions 46b-1~46b-3 after the lapse of another time t1, the signals are read from the elements located in this state on said trajectories. In this manner the information reading along the trajectories n-1, n-3 and n-5 can be achieved by detecting the signals from the light-receiving elements in succession in said photoreceptors.

Upon completion of the scanning of the trajectories n-1, n-3 and n-5, the elements P-1 of the photoreceptors 46-1~46-3 become located on the start points of the reading trajectories n-4, n-6 and n-8 after a short period t required for the displacement of the nozzles from the trailing end to the leading end of the recording paper 13 on the drum 12, whereupon the information reading by the light-receiving elements P can be initiated again in the same manner.

Such reading along the trajectory 22-1 can be achieved, in case said photoreceptors and the reading trajectories are both linear, by driving 1800 light-receiving elements from the P-1 side at regular intervals during the displacement of the photoreceptors by a distance 3Ld.

Although the foregoing explanation has been given for a case of $\theta 1 = 0$, it will be easily understood that the angle $\theta 1$ in this third embodiment can assume other values not equal to $\theta$. In such case wherein $1 \neq \theta$, the value of said $\theta 1$ can be defined by the following equation:

$$\theta 1 = \tan^{-1}(\tan \theta - VT/L)$$

wherein

L is the width of recording as shown in FIG. 1B,
V is the displacing speed of the photoreceptors, and T is the time required for forming one trajectory as shown in FIG. 1B.

Figure 6A:
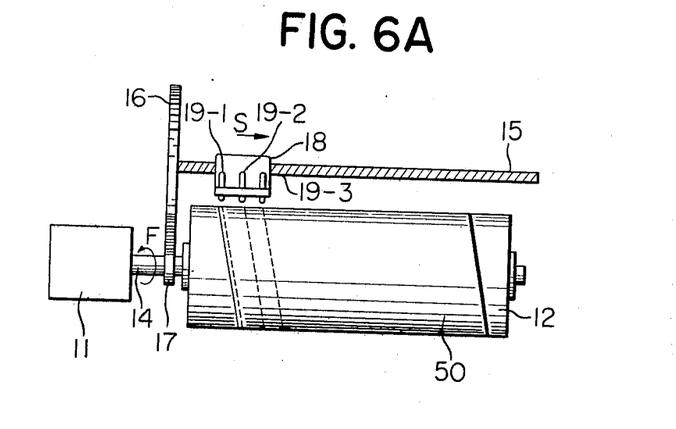
FIG. 6A is a lateral view of another embodiment of the recording apparatus.
Figure 7A:
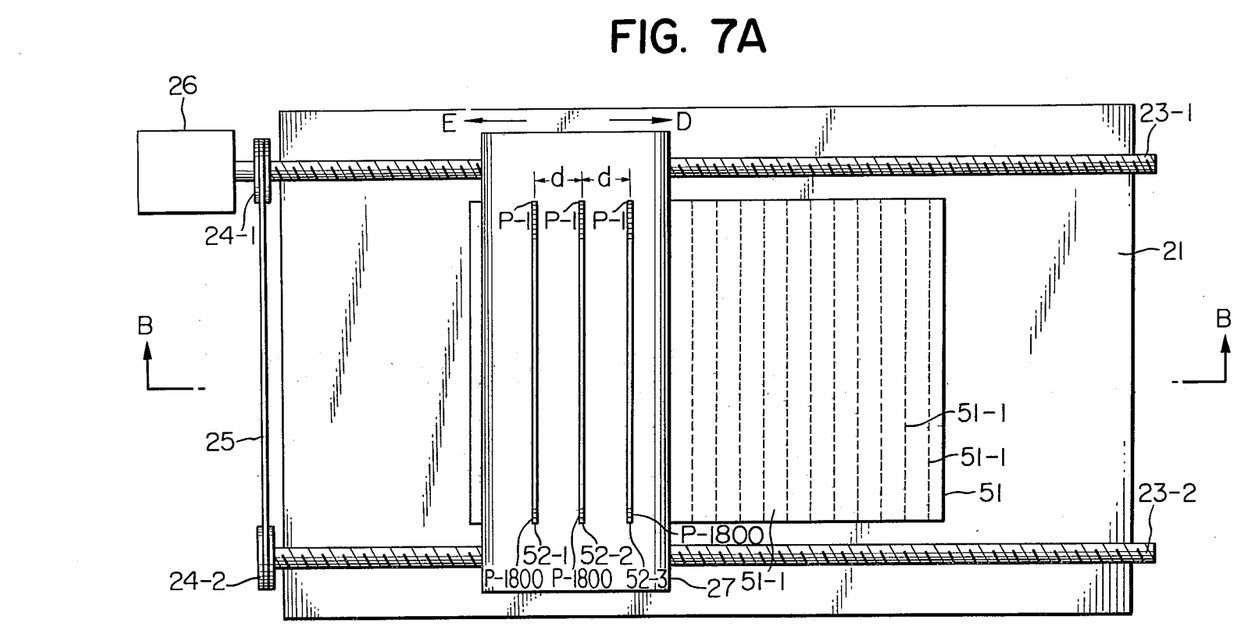

Though in the foregoing embodiments the recording paper is wound on the drum of the recording apparatus in such a manner that the lateral edges of said recording paper are parallel to a plane perpendicular to the rotary axis of the drum, it is also possible, in still another embodiment as shown in FIG. 6, to wind the recording paper 50 in such a manner that the lateral edges thereof become parallel to the recording trajectories formed by the nozzles 19. In such case the photoreceptors 52-1~52-3, shown in FIG. 7, are arranged on the support 27 in a direction perpendicular ($\theta = 0$) to the displacing direction of said photoreceptors 52, and the reading function is performed so as to form reading trajectories with a zero angle. Such photoreceptors are mutually spaced by a distance d as in the foregoing embodiments.

In such information reading apparatus the signals are supplied in succession from the light-receiving elements P-1, P-2, . . . to the nozzles 19-1~19-3 as explained in connection with FIG. 3 while said support 27 is maintained at a fixed position and the drum is rotated at a constant speed.

Figure 6B:
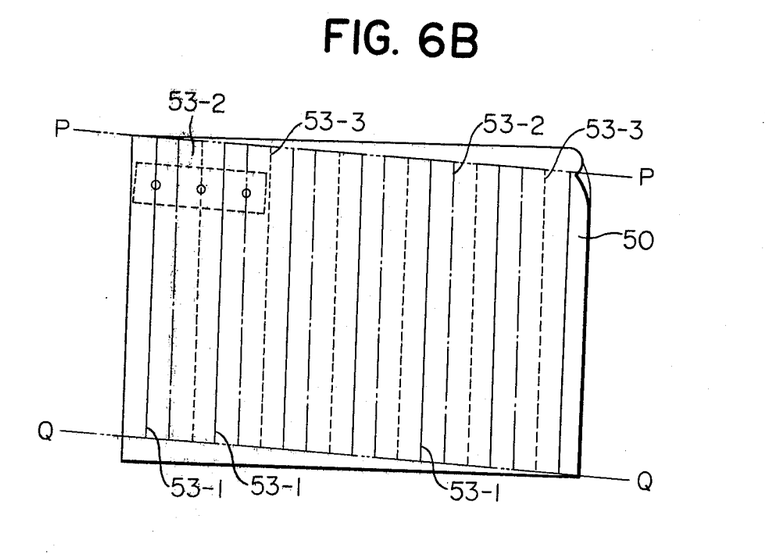
FIG. 6B is a plan view of the recording paper.

Upon generation of an end pulse after approximately one rotation of the drum during which the signal reading up to the light-receiving elements P-1800 is completed, the support 27 is displaced by a distance 3Ld in the direction of the arrow D until a position signal is generated and a start pulse is generated, whereby the signal supply is again initiated in succession from the elements P-1, P-2, . . . to the nozzles 19-1~19-3. In this manner, by step advancing the support by an interval of 3Ld and rotating the drum at a constant speed, the recording trajectories are formed as shown in FIG. 6B on the recording paper 50 wound on the drum 12 while the reading trajectories 51-1 on the original 51 assume the form shown in FIG. 7A. In this case, as shown in FIG. 6B, the upper and lower ends of the recording trajectories formed by the nozzles 19 are located on the straight lines P-P and Q-Q which are not perpendicular to said recording trajectories.

Stated differently, the area covered by the reading trajectories 51-1 on the original 51 is somewhat different from the area covered by the recording trajectories 53.

Figure 7B:
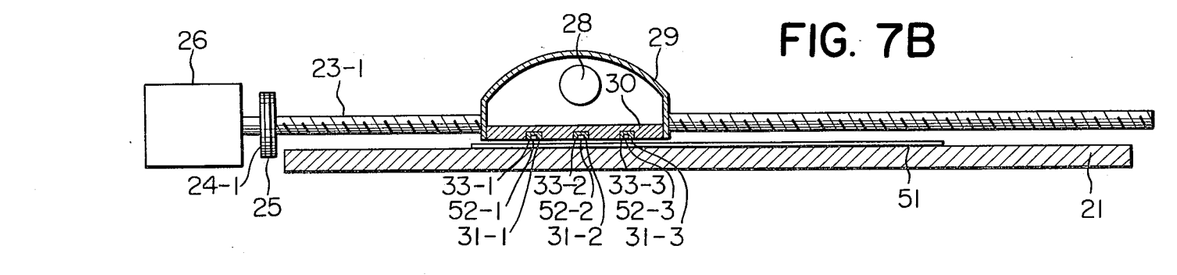

Consequently in the embodiment shown in FIGS. 6 and 7 the recording obtained on the recording paper 50 is slightly distorted from the information on the original 51. The extent of said distortion is determined by the inclination of the recording trajectories formed by the nozzles on the recording paper, and is almost negligible if the displacing pitch of said nozzles 19 is satisfactorily small.

Thus the embodiment shown in FIGS. 6 and 7 enables to obtain reading trajectories on the original 51 perpendicular to the displacing direction of the photoreceptors 52 and also the recording trajectories on the recording paper 50 parallel to the lateral edges thereof.

Also in order to obtain the record signals to be employed in the recording apparatus as shown in FIG. 6, it is also possible, based on a principle similar to that of the embodiment shown in FIG. 5, to arrange the photoreceptors of FIG. 7 with an inclination angle of $-\theta$ and to activate the light-receiving elements in succession while continuously displacing the photoreceptors at a constant speed thereby forming the reading trajectories as represented by 51-1.

In contrast to the foregoing embodiments wherein the number of the nozzles is identical to that of the photoreceptors, it is also possible to reduce the number of photo-receptors with respect to the number of nozzles by the use of a certain number of memories.

Figure 8:
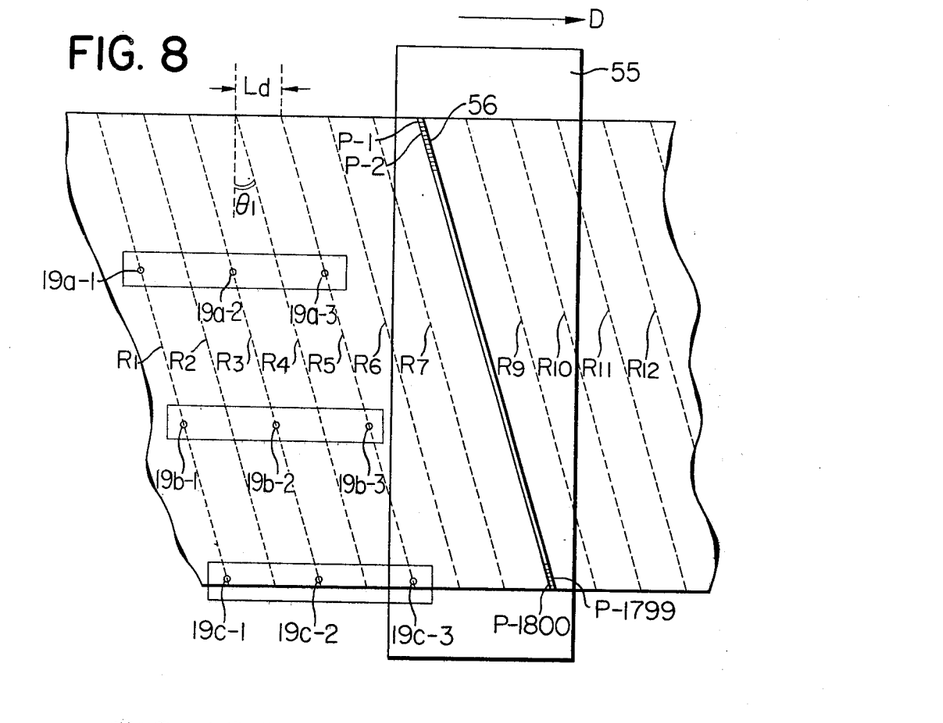
FIG. 8 is a plan view of a principal part of another embodiment of the information reading apparatus.

FIG. 8 shows the principal portion of an information reading apparatus provided with a photoreceptor for forming the record signals to be supplied to the recording apparatus shown in FIG. 1, while the unrepresented portions being constructed in a similar manner as shown in FIG. 2. On a support 55, corresponding to the aforementioned support 27 there is provided a photoreceptor 56 composed of a linear arrangement of 1800 light-receiving elements P-1~P-1800 and positioned with an inclination angle $\theta 1$ equal to the angle $\theta$. Said support 55 is continuously displaced in the direction of the arrow D at a constant speed equal to the nozzle displacing speed of the recording apparatus shown in FIG. 1, but said support is designed, different from the foregoing embodiments, to read the position ahead of the recording position of the nozzles of the recording apparatus.

The reading position should be ahead of the recording position at least by three reading trajectories which are equal to the amount of the interlaced scanning. Referring to FIG. 8, when the nozzles 19-1~19-3 complete the recording of the signals obtained from the reading trajectories R1, R3 and R5, the photoreceptor 56 should be located on the reading trajectory R8 or be still ahead.

Figure 9:
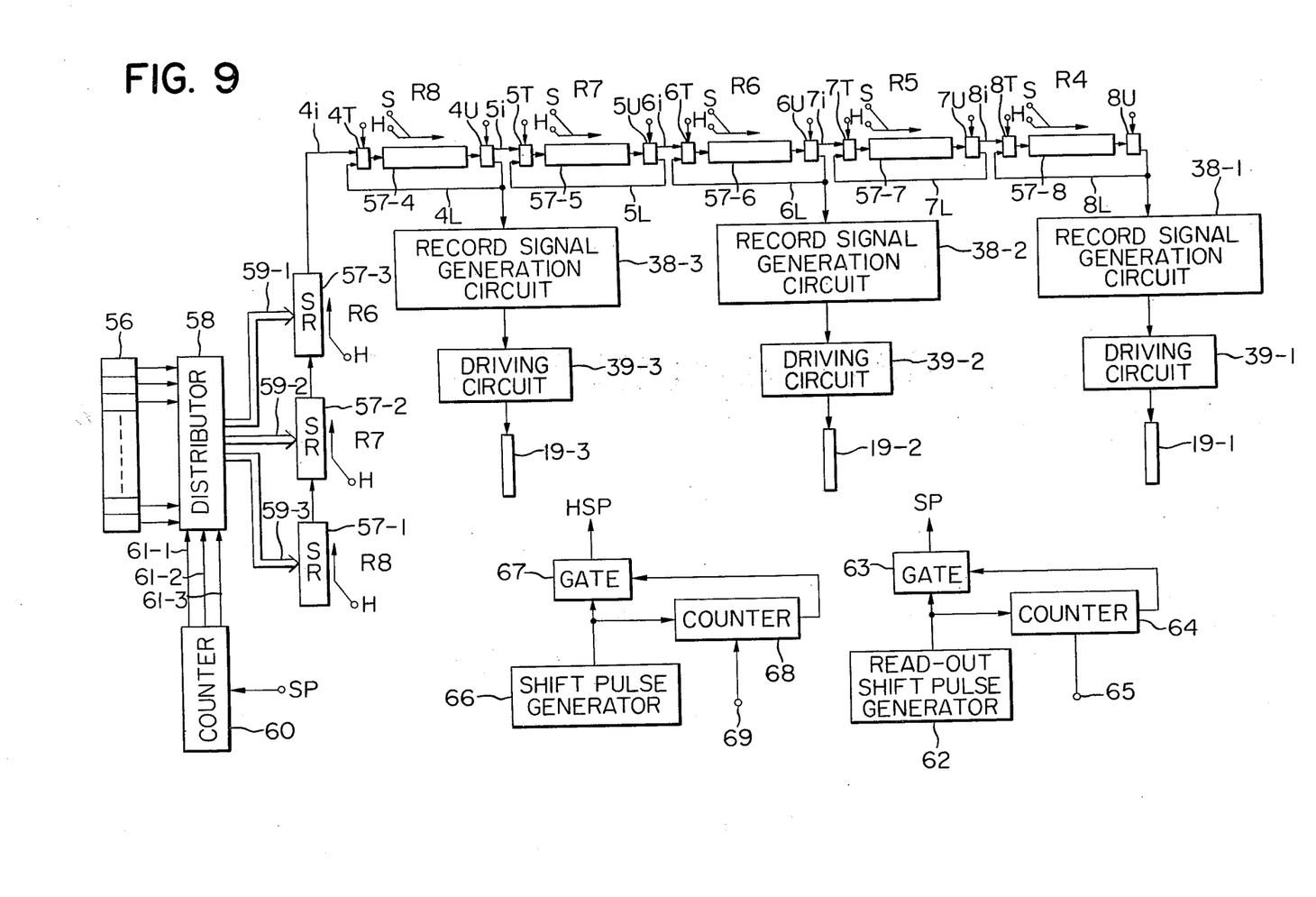
FIG. 9 is a block diagram of a control circuit to be employed in the information reading apparatus.

FIG. 9 shows a block diagram of a control circuit to be employed in the information reading apparatus provided with the photoreceptor 56 as shown in FIG. 8, wherein the components same as those explained before being numbered same and omitted from the following explanation.

In FIG. 9 shift registeres 57-1~57-8 each of a capacity of 1800 bits equal to the number of the light-receiving elements P constituting the photoreceptor 56 are serially connected partially through gate circuits, wherein all the shift registers are respectively provided with H-terminals for receiving high-frequency shift pulses HSP while the shift registers 57-4~57-8 are additionally provided respectively with S-terminals for receiving low-frequency shift pulses SP. Said shift registers 57-4~57-8 are respectively provided, at the input end and output end thereof, with input gates 4T-8T and output gates 4U-8U which are respectively connected to constitute circulating loops 4L-8L. Said input and output gates are respectively provided with control terminals and function, upon receipt of a high-level signal at said terminals to form said circulating loops and upon receipt of a low-level signal to constitute the shifting circuit. More specifically with respect for example to the shift register 57-6, the gates 6T, 6U, upon receipt of a high-level signal to the control terminals thereof, close the signal entry to the shift register 57-6 through an input line 6i thereby allowing the signal circulation through the loop 6L to the shift register 57-6. At the same time the output signals from said shift register 57-6 are not supplied to an input line 7i but supplied to the loop 6L. Also upon receipt of a low-level signal at said control terminals, the signals are supplied to the shift register 57-6 from the input line 6i and the signals from said shift register are supplied to the input line 7i while said circulating loop 6L being cut off.

Thus, by supplying the set output of a flip-flop to be set by the start pulse of the recording apparatus and to be reset by the end pulse thereof simultaneously to all the control terminals of the above-mentioned input and output gates, the control circuit becomes composed of a series of circulating shift registers when the nozzles are located in front of the recording paper while it becomes composed of serially connected shift registers in the transfer mode when said nozzles are not facing the recording paper. The circulating loops 4L, 6L and 8L of the shift registers 57-4, 57-6 and 57-8 are respectively connected to the record signal forming circuits 38 shown in FIG. 3, while said shift registers 57-1, 57-2 and 57-3 receive in a parallel manner, through a distributor 58 and transfer channels 59-1~59-3, the output signals from said photoreceptor 56. Said distributor 58 is controlled by the counting output of a counter 60 for counting the shift pulses SP, said counter being constructed to release a pulse signal on a signal line 61-1 upon counting 600 shift pulses thereby causing the transfer of the output signals from the photoreceptor 56 through the transfer channel 59-1 to the shift register 57-3, to release a pulse signal on a signal line 61-2 upon counting 1200 shift pulses thereby causing the transfer of the output signals from the photoreceptor 56 through the transfer channel 59-2 to the shift register 57-2, and to release a pulse signal on a signal line 61-3 upon counting 1800 shift pulses thereby causing the transfer of the output signals from the photoreceptor 56 through the transfer channel 59-3 to the shift register 57-1. 62 is a read-out shift pulse generator of which frequency is determined so as to obtain the shift pulses of a number corresponding to the number of the light-receiving elements (1800) during the period required by a nozzle to form a recording trajectory. The output signals from said shift pulse generator 62 are supplied to the shift terminals S of the shift registers through a gate 63, which is controlled by a gate 64 which opens said gate upon receipt of a trigger pulse at the terminal 65 and closes said gate upon counting 1800 shift pulses. Thus, if the start pulse obtained from the recording apparatus is utilized as the above-mentioned trigger pulse, 1800 shift pulses are supplied in succession to said shift register 57-4~57-8 upon arrival of the nozzles at the record start position.

66 is a shift pulse generator of which output signals are supplied to a gate 67 and a gate 68, which opens said gate 67 upon receipt of a trigger pulse at the terminal 69 and closes said gate 67 upon counting 1800×3 shift pulses. Thus, if the end pulse from the recording apparatus is utilized as said trigger pulse to the terminal 69, the high-frequency shift pulses HSP in a number of 1800×3 are supplied in succession to all the shift registers 57.

In case of recording the information corresponding to the reading trajectories R-1, R-3 and R-5 by means of the nozzles 19 on the recording paper, the signals of said trajectories R-5~R-1 are respectively stored in the shift registers 57-4~57-8. Upon supply of a start pulse from the recording apparatus to the terminal 65, the input and output gates 4T–8T, 4U–8U are controlled to operate the shift registers 57-4~57-8 in a circulating mode, and thereafter 1800 shift pulses are supplied in succession to the terminals S of said shift registers 57-4~57-8, whereby the record signals retrieved from the shift registers 57-4, 57-6 and 57-8 are supplied in succession to the respective nozzles 19-3~19-1 to initiate the recording on the recording paper. Upon arrival of the nozzles at a position 19a corresponding to ⅓ of the recording trajectories, the counter 60 detects the 600th shift pulse to transfer the signals from the photoreceptor 56 to the shift register 57-3.

In this manner the shift register 57-3 stores the information of the recording trajectory R6 as said photoreceptor 56 is located on said trajectory R6 when the nozzles are performing the recording of the information corresponding to the position 19a. Thereafter upon arrival of the nozzles at a position 19b corresponding to ⅔ of the recording trajectories, the counter 60 detects the 1200th shift pulse to transfer the signals from the photoreceptor 56 to the shift register 57-2.

In this manner the shift register 57-2 stores the information of the recording trajectory R7 as said photoreceptor 56 is located on said trajectory R7 when the nozzles are performing the recording of the information corresponding to the position 19b. Similarly the shift register 57-1 stores the information of the recording trajectory R8 as said photoreceptor 56 is located on said trajectory R8 when the nozzles are performing the recording of the information corresponding to the position 19.

Said shift registers 57-1~57-3, not receiving the shift pulses, retain therein the signals of the trajectories R8, R7 and R6. Upon completion of the signal recording corresponding to the R5, R3 and R1, the recording apparatus releases an end pulse, upon receipt of which the counter 68 supplies high-frequency shift pulses in a number of 3×1800 to all the shift registers. Also the shift registers 57-4~57-8 are switched to a transfer mode as the input and output gates 4T–8T, 4U–8U receive a low-level signal. The frequency of said shift pulses is selected in such a manner that 3×1800 shift pulses can be generated prior to the succeeding start pulse. By means of said shift pulses the contents of the shift registers are transferred by an amount corresponding to three reading trajectories, i.e. the content of the shift register 57-3 to the shift register 57-6 through 57-4 and 57-5, the content of the shift register 57-2 to the shift register 57-5 through 57-3 and 57-4 and so on.

As the result the shift registers 57-4~57-8 store the signals of the reading trajectories 8R–4R and retain this state since the shift pulses HSP are no longer supplied after said shift by three reading trajectories. Upon reentry of a start pulse in this state, all the input and output gates are controlled to the circulating mode, whereby the signals of the trajectories R8, R6 and R4 stored in the shift registers 57-4, 57-6 and 57-8 are respectively supplied to the nozzles 19-3, 19-2 and 19-1, thus repeating the control explained in the foregoing.

As explained in the foregoing, it is rendered possible to reduce the number of photoreceptors with respect to the number of nozzles through the use of a certain number of memories. Although the support 55 in the embodiment of FIG. 8 has been explained as being continuously displaced, it is naturally possible also to step advance the support 55 as in other foregoing embodiments.

Also the photoreceptor 56 can be arranged perpendicularly to the displacing direction thereof as explained in FIG. 7A if a recording apparatus as explained in FIG. 6A is to be employed.

Although in the foregoing embodiment the reading apparatus is provided with photoreceptors which are of a dimension corresponding to that of the original and are displaced in the vicinity thereof, the original scanning may also be achieved by other methods as will be explained in the following.

Figures 10A, 10B:
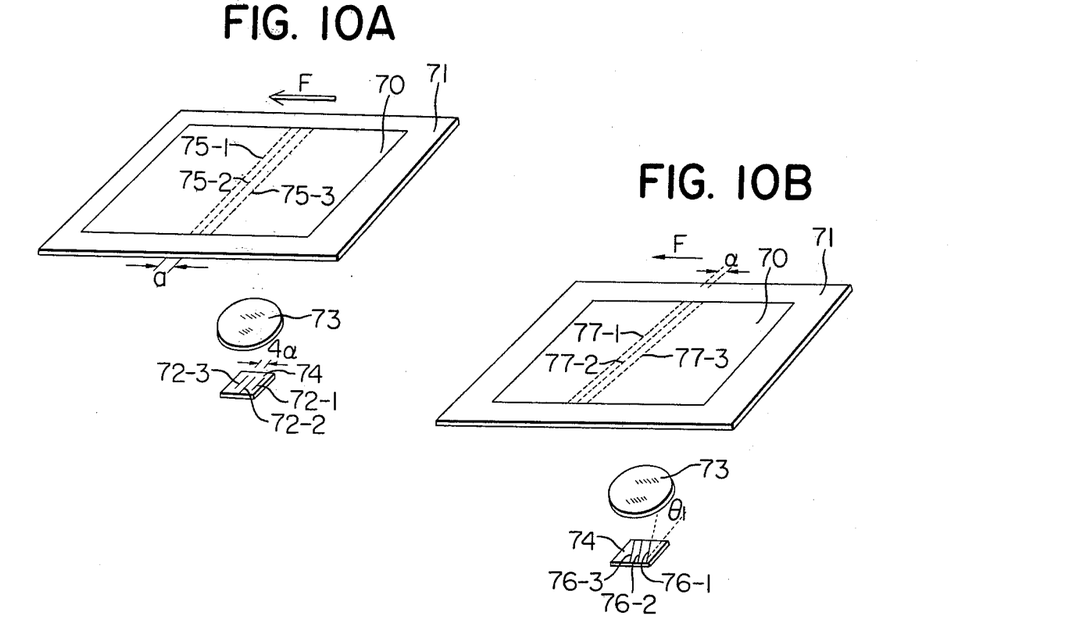
FIGS. 10A and 10B are perspective views showing still other embodiments of the information reading apparatus.

FIG. 10 shows an information reading apparatus in which the scanning operation by the photoreceptor 72 is achieved by the displacement of an original table 71 holding an original 70 thereon. In this apparatus the original 70 placed on a transparent original table 71 composed for example of a glass plate is illuminated from under said table 70, and the image of said original is focused, through a lens 73, onto photoreceptors 72-1∼72-3 arranged on a support 74.

As in the foregoing embodiments, said photoreceptors 72 are respectively composed of a linear arrangement of 1800 light-receiving elements and are mutually parallel and spaced by a distance Δd. As shown in FIG. 10A the positions of said photoreceptors 72 correspond to linear areas 75-1, 75-2 and 75-3 which are mutually spaced by the aforementioned distance d and are selected parallel to the end edges of the original 70.

In such arrangement the photoreceptors 72 are positioned with respect to the original 70 in a substantially same manner as explained in FIGS. 5 and 7, so that the control explained in the foregoing can be satisfactorily employed also in this case.

More specifically in case the original table 71 in FIG. 10A is continuously displaced in a direction of the arrow F at a constant speed, the record signals usable in the recording apparatus shown in FIG. 1 can be obtained by reading the signals from the elements P-1∼P-1800 of the photoreceptors 72 in the manner as explained in connection with FIG. 5.

Also in case the original table 71 is step advanced in the direction of the arrow F by a pitch of 3Ld, the signals usable in the recording apparatus shown in FIG. 6A can be obtained by reading the signals from said elements of the photoreceptor in the manner as explained in connection with FIG. 7.

Also in case the photoreceptors are inclinedly provided by an angle $\theta 1$ as shown in FIG. 10B, said photoreceptors 76 correspond to the dotted linear areas 77-1∼77-3 on the original 70 which are therefore selected to be mutually spaced by a distance d and inclined by an angle $\theta 1$ with respect to the displacing direction of the original.

In such arrangement the photoreceptors 76 are positioned with respect to the original in a substantially same manner as explained in FIG. 2, so that the control explained in the foregoing can be satisfactorily employed also in this case.

More specifically in case the original table 71 in FIG. 10B is displaced in a direction of the arrow F at a constant speed or stepwise, the record signals usable in the recording apparatus shown in FIG. 1 can be obtained by reading the elements P-1∼P-1800 of the photoreceptors in the manner as explained in connection with FIG. 2.

In the embodiment shown in FIG. 10, the displacement of the original table 71 may naturally be replaced by an integral displacement of the lens and the support, or the displacement of the original table in combination with an integral displacement of the lens and the support.

Also in the embodiment shown in FIG. 10B it is also possible to reduce the number of photoreceptors 76 with respect to the number of nozzles as shown in FIG. 8 and to control the reading operation by means of a circuit as explained in FIG. 9.

Although in the foregoing embodiments the information reading apparatus has been explained as separate from the recording apparatus, it will be apparent that the combination of said two apparatus provides a copying apparatus.

Such copying apparatus can be obtained by combining the recording apparatus shown in FIG. 1 with the information reading apparatus shown in FIG. 2, 5 or 8 or by combining the recording apparatus shown in FIG. 6 with the information reading apparatus shown in FIG. 7.

FIG. 11 shows a copying apparatus utilizing still another scanning method for scanning an original placed on an original table by means of a movable optical system, wherein 80 is a casing enclosing the apparatus, and an original such as a document or a book is placed on an original table 81 composed for example of a transparent blass plate and provided in the upper portion of said casing 80. Said original table 81 is stationary, and the image projection onto the support 83 provided thereon with photoreceptors 82 to be explained is achieved by the displacement of a part of the optical system, comprising a first mirror 84 and an original illuminating lamp 85 which are displaced at a speed V along the entire length of said original table 81 from the full-lined position to the chain-lined position at the right-hand end, and a second mirror 86 displaced at a speed of V/2 from the full-lined position to the chain-lined position at the right-hand end and simultaneously with the displacement of said first mirror 84. The image of the original obtained by scanning operation of said first and second mirrors 84, 86 is focused, through a lens system 87 provided with a diaphragm and a fixed mirror 88, onto the support 83 provided thereon with photoreceptors 82 and positioned so as to be perpendicular to the light beam 89 reflected from said original, the path of said light beam being enclosed by a cover 90 to prevent entry of stray light into said photoreceptors 82. Within said casing 80, the space defined by a wall 91 accomodates a recording apparatus for example as shown in FIG. 1 or 6A, whereby the space inside said casing 80 constitutes a copying apparatus.

Figure 11A:
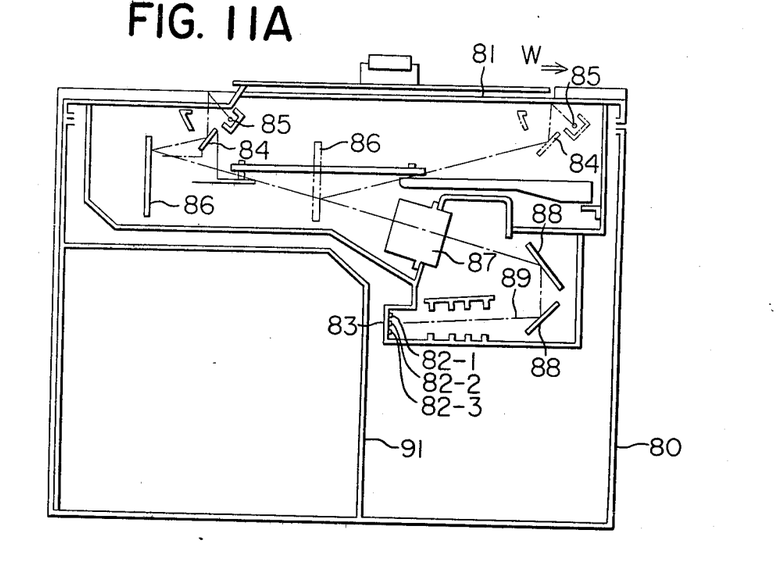
FIG. 11A is a cross-sectional view of a copying apparatus.
Figure 11B:
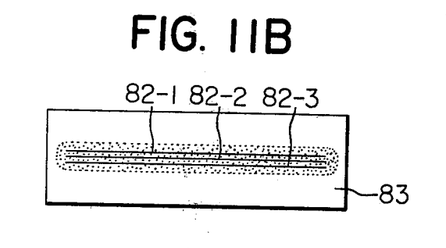
FIGS. 11B and 11C are elevation views of principal portions thereof.
Figure 11C:
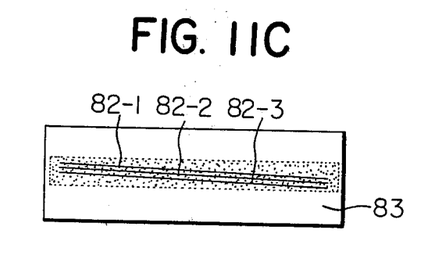

On said support 83 there are provided photoreceptors 82 in the manner as shown in FIG. 11B or 11C, wherein the rectangular slit-shaped area surrounded by dotted line receives the light beam reflected from the original.

Figure 11D:
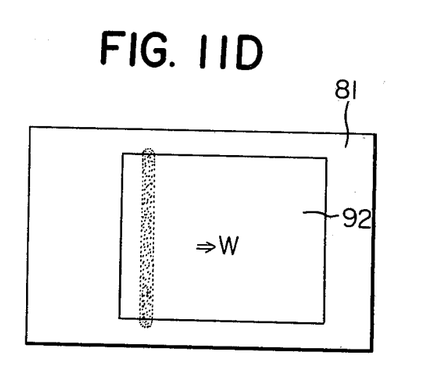
FIG. 11D is a plan view of said copying apparatus.

Said slit-shaped area corresponds, on the original 92 placed on the original table 81, to a slit-shaped area as represented by dots in FIG. 11D which is displaced in a direction of the arrow W by the above-explained displacement of the lamp 85 and mirrors 84, 86. Consequently the photoreceptors 82 are capable of providing the record signals same as those explained in connection with FIG. 2, 5 or 7.

Further, it is also possible to utilize only one photoreceptor on the support 83, based on the principle explained in connection with FIG. 8.

Although the present invention has been explained on the embodiments thereof utilizing recording nozzles as the recording elements, it will be apparent that the present invention is by no means limited to such embodiment but is also applicable to other apparatus employing plural recording elements of other types.

Furthermore, in more generalized terms, the satisfactory information reading over the entire area of the original can be achieved in the embodiments shown in FIGS. 2, 5, 7, 10 and 11 for a number N' of mutually parallel photoreceptors spaced by a distance equal to k' times of the minimum distance of the reading scan lines, if k'/N' is non-reducible and the displacing pitch of the reading position is equal to N'×Ld' wherein Ld' is the distance of the photoreceptors.

What we claim is:

1. An information reading apparatus, comprising:
   original support means for supporting an original to be read;
   reading means for reading the information from said original supported by said original support means, said reading means including a plurality (n) of arrays, each of which consists of plural reading elements and has a reading range capable of reading a full span, in one direction, of the information of the original, each of said arrays being spaced from an adjacent one a distance obtained by multiplying a minimum interval at which the information is read by k, where k is such an integer that k/n is an irreducible fraction;
   displacing means for displacing, in a direction transverse of said one direction, the position of information reading by said reading means on said original supported by said original support means;
   detecting means for detecting the amount of displacement of the reading position by said displacing means; and
   instructing means for instructing the start of information reading by said reading means upon detection by said detecting means of the displacement of the reading position by a distance obtained by multiplying said minimum interval by n.

2. An apparatus according to the claim 1, wherein said original support means comprise a flat bed for supporting an original in a planar manner.

3. An apparatus according to the claim 1, further comprising illuminating means for illuminating the original supported by said original support means and optical means for introducing the light reflected by said original to said reading means, wherein said displacing means displaces said optical means.

4. An apparatus according to the claim 1, further comprising signal supply means for supplying the output signals of said reading arrays respectively to recording elements of a number equal to that of said reading arrays.

5. An apparatus according to claim 1, wherein said displacing means includes illuminating means for illuminating the original supported by said original support means and optical means for introducing the light reflected by said original to said reading means.

6. An information reading apparatus, comprising:
   original support means for supporting an original to be read;
   reading means for reading the information from said original supported by said original support means, said reading means including a plurality (n) of arrays, each of which consists of plural reading elements and has a reading range capable of reading a full span, in one direction, of the information of the original, each of said arrays being spaced from an adjacent one a distance obtained by multiplying a minimum interval at which the information is read by k, where k is such an integer that k/n is an irreducible fraction;
   displacing means for displacing, in a direction inclined, by angle $\theta$ ($\theta\neq 0$), with respect to the perpendicular direction to said one direction, the position of information reading by said reading means on said original supported by said original support means;
   detecting means for detecting the amount of displacement of the reading position by said displacing means; and
   instructing means for instructing the start of information reading by said reading means upon detection by said detecting means of the displacement of the reading position by a distance obtained by multiplying said minimum interval by n.

7. An apparatus according to the claim 6, wherein said displacing means comprise displacing means for intermittently stopping and displacing said reading position.

8. An apparatus according to the claim 7, wherein said instructing means comprise supply means for supplying the outputs of reading elements constituting said reading arrays to recording elements of a number equal to that of said reading arrays while said reading position is stopped by said displacing means.

9. An apparatus according to the claim 6, wherein said displacing means comprise constant speed displacing means for displacing said reading position at a constant speed.

10. An apparatus according to the claim 9, further comprising memory means for storing the information obtained by said reading means, and transfer means for reading the information at a time from said arrays of said reading means and transferring it to said memory means in response to an instruction from said instructing means.

11. An apparatus according to the claim 10, further comprising sequential supply means for sequentially supplying the information from said memory means to recording elements of a number equal to that of said reading arrays.

12. An information reading apparatus, comprising:
   original support means for supporting an original to be read;
   reading means for reading the information from said original supported by said original support means, said reading means including a plurality (n) of arrays, each of which consists of plural reading elements and has a reading range capable of reading a full span, in one direction, of the information of the original, each of said arrays being spaced from an adjacent one a distance obtained by multiplying a minimum interval at which the information is read by k, where k is such an integer that k/n is an irreducible fraction;
   displacing means for displacing, in a direction transverse of said one direction, the position of information reading by said reading means on said original supported by said original support means;
   detecting means for detecting the amount of displacement of the reading position by said displacing means; and
   actuating means for sequentially actuating, upon detection by said detecting means of the displacement of the reading position by a distance obtained by multiplying said minimum interval by n, said reading elements in the manner that the trace of the reading of the arrays of the reading elements is inclined by $\theta$ ($\theta\neq 0$) with respect to the arrays.

13. An apparatus according to the claim 12, wherein said displacing means comprise constant speed displacing means for displacing said reading means at a constant speed.

14. An apparatus according to the claim 13, wherein said reading means comprise signal supply means for supplying the outputs of said reading arrays respectively to recording elements of a number equal to that of said reading arrays.

15. An information reading apparatus, comprising:

original support means for supporting an original to be read;

reading means for reading the information from said original supported by said original support means, said reading means including a single reading array composed of plural reading elements, said array having a reading range capable of reading a full span, in one direction, of the information of the original;

displacing means for displacing the position of information reading by said reading means on said original supported by said original support means in a direction substantially perpendicular to said array;

detecting means for detecting the amount of displacement of the reading position by said displacing means;

instructing means for instructing the start of information reading by said reading means upon detection by said detecting means of the displacement of the reading position through a predetermined distance;

first reading-out means for reading, m times, out of said reading means in response to said instructing means;

first memory means for storing the information of the amount of m scanning lines read out by said first reading-out means;

second memory means for storing at least the information of the amount of m scanning lines read out of said first memory means;

second reading-out means for sequentially reading out in parallel the information of the amount of m scanning lines stored in said second memory means.

16. An apparatus according to claim 15, further comprising third reading-out means for reading out the information of said first memory means, the reading-out speed of said third reading-out means being higher than the reading-out speed of said second reading-out means.

17. An apparatus according to claim 15, wherein said first memory means includes a shift register.

18. An apparatus according to claim 15, wherein said second memory means includes a shift register.

* * * * *

UNITED STATES PATENT AND TRADEMARK OFFICE
CERTIFICATE OF CORRECTION

PATENT NO. : 4,268,870

DATED : May 19, 1981

INVENTOR(S) : TAKASHI KITAMURA, ET AL.

It is certified that error appears in the above—identified patent and that said Letters Patent is hereby corrected as shown below:

Column 8, line 35, "registeres" should be --registers--; line 64, "being" should be --is--.

Column 14, line 7, after "comprise", delete "displacing".

Signed and Sealed this

Sixth Day of October 1981

|SEAL|

Attest:

GERALD J. MOSSINGHOFF

Attesting Officer　　　Commissioner of Patents and Trademarks